(12) United States Patent
Lecole et al.

(10) Patent No.: US 8,179,070 B2
(45) Date of Patent: May 15, 2012

(54) METHOD OF CONTROLLING A REVERSIBLE ELECTRIC MACHINE

(75) Inventors: Brice Lecole, Paris (FR); Magali Laurence, Paris (FR)

(73) Assignee: Valeo Equipements Electriques Moteur, Creteil (FR)

( * ) Notice: Subject to any disclaimer, the term of this patent is extended or adjusted under 35 U.S.C. 154(b) by 754 days.

(21) Appl. No.: 11/575,762

(22) PCT Filed: Sep. 22, 2005

(86) PCT No.: PCT/FR2005/002356
§ 371 (c)(1),
(2), (4) Date: Apr. 29, 2009

(87) PCT Pub. No.: WO2006/032796
PCT Pub. Date: Mar. 30, 2006

(65) Prior Publication Data
US 2009/0206786 A1      Aug. 20, 2009

(30) Foreign Application Priority Data
Sep. 23, 2004   (FR) ...................................... 04 10092

(51) Int. Cl.
*H02P 1/06* (2006.01)
*H02K 7/10* (2006.01)
(52) U.S. Cl. ...................................... 318/445; 318/282

(58) Field of Classification Search .......... 318/280–282, 318/445–447, 456, 461
See application file for complete search history.

(56) References Cited

U.S. PATENT DOCUMENTS

| 4,412,137 A | 10/1983 | Hansen et al. |
| 4,414,937 A | 11/1983 | Ueda et al. |
| 5,451,820 A | 9/1995 | Gotoh et al. |
| 5,887,670 A * | 3/1999 | Tabata et al. ............... 180/65.25 |
| 6,335,609 B1 | 1/2002 | Amey et al. |
| 6,736,227 B2 | 5/2004 | Huang et al. |
| 6,830,534 B2 | 12/2004 | Seibertz et al. |
| 7,017,692 B2 | 3/2006 | Grassl et al. |
| 2003/0087724 A1* | 5/2003 | Seibertz et al. ................. 477/92 |
| 2003/0230442 A1 | 12/2003 | Huang et al. |
| 2004/0035618 A1 | 2/2004 | Grassl et al. |

FOREIGN PATENT DOCUMENTS

EP          1 469 587 A1       10/2004

* cited by examiner

*Primary Examiner* — Derek Rosenau
(74) *Attorney, Agent, or Firm* — Jacox, Meckstroth & Jenkins

(57) ABSTRACT

A method of preparing a reversible electric machine with a phase for starting a heat engine of a vehicle that is equipped with an automatic start/stop system, whereby said machine comprises a rotor which is connected to the heat engine. The method comprises the following steps consisting in detecting an action prior to a heat engine start command and applying a magnetizing electric current to the rotor of the machine upon detection of the action.

10 Claims, 1 Drawing Sheet

METHOD OF CONTROLLING A REVERSIBLE ELECTRIC MACHINE

BACKGROUND OF THE INVENTION

1. Field of the Invention

The present invention concerns a method of preparing a reversible electrical machine with a phase for starting a thermal engine of a vehicle.

The invention finds a particularly advantageous application in the field of the automobile industry, and more especially in that of vehicles equipped with an automatic starting/stopping system, such as the system known by the English term "Stop and Go".

2. Description of the Related Art

Vehicles able to function according to the "Stop and Go" mode are equipped with a reversible electrical machine, or alternator/starter, coupled to the thermal engine, by means of a belt for example. In general terms, a reversible electrical machine of a vehicle combines two distinct functions, namely on the one hand the conventional function of alternator when the shaft of the thermal engine drives the rotor of the machine so as to produce an electric current at the stator, and on the other hand the starter function when conversely a current applied to the stator of the machine causes the rotor to rotate, which then drives the shaft of the thermal engine in a similar manner to a conventional starter.

The application of an alternator/starter to the "Stop and Go" operating mode consists, under certain conditions, of causing the complete stoppage of the thermal engine when the vehicle is itself at rest, and then restarting the thermal engine following, for example, an action by the driver interpreted as a restart request. A typical situation of "Stop and Go" is that of stopping at a red light. When the vehicle stops at the light, the thermal engine is automatically stopped and then, when the light goes green, the engine is restarted in particular by means of the alternator/starter following the detection by the vehicle starting control system of the pressing of clutch pedal by the driver or any other action that may be interpreted as the intention of the driver to restart his vehicle. The advantage of "Stop and Go" mode in terms of energy saving and pollution reduction, especially in an urban environment, will be understood.

When it is wished to start a thermal engine initially at rest by means of an alternator/starter, the first phase to be implemented is magnetizing the rotor by sending it a maximum excitation current. This magnetization, necessary for obtaining the required torque for starting the thermal engine, must last for a certain amount of time, around 150 ms, before the inverter is started up in order to make the rotor turn by applying an electric current to the stator of the machine.

This rotor preparation phase is executed on a start instruction sent by a control module responsible for managing the "Stop and Go" system, the starting being made effective by the excitation of the stator only after expiry of the magnetization period of approximately 150 ms.

This magnetization period therefore causes a routine delay in the starting of the thermal engine, prejudicial to the enjoyment and efficacy of driving when the automatic starting/stopping system of the vehicle is activated.

SUMMARY OF THE INVENTION

It is precisely an object of the present invention to define the ways in which an instruction to start the thermal engine of the vehicle could be executed in the context of a "Stop and Go" system without suffering the negative effect of the delay necessary for preparing the alternator/starter to execute a start instruction by magnetization of the rotor.

This object is achieved, in accordance with the present invention, by the implementation of a method of preparing a reversible electrical machine with a phase for starting a thermal engine of a vehicle equipped with an automatic starting/stopping system, the said reversible electrical machine comprising a rotor coupled to the thermal engine, characterized in that the said method comprises steps consisting of detecting an action prior to an instruction to start the thermal engine, and applying an electrical magnetization current to the machine as soon as the prior action is detected.

Thus, by applying the magnetization electric current at the very moment when a prior action is detected, and therefore before an actual start instruction has been given, the method according to the invention makes it possible to magnetize the rotor by anticipation. The result is a reduction in the interval of time elapsing between the start instruction and a moment when the thermal engine actually starts, because at least part of the rotor magnetization phase is masked in the time separating the action prior to starting and the sending of the start instruction.

Naturally, it may happen that the anticipated preparation of the rotor has been carried out without being followed by an actual start instruction. In this case, the invention provides for the application of the magnetization electric current to be interrupted if a start instruction is not triggered after a given time after detection of the prior action. This time may for example be three seconds.

In addition, the invention proposes that, after an interruption in the application of the magnetization electric current, a new attempt at preparing the reversible electrical machine is made only after cancellation of the prior action. It is thus ensured that the method according to the invention is indeed reset before a new starting attempt.

So as to avoid any overheating of the alternator/starter, the invention recommends that a new attempt at preparing the reversible electrical machine is prevented after a given maximum number of interrupted attempts. This maximum number of attempts may be equal to five.

According to a particular embodiment of the invention, the prior action is a pressing of a control pedal for driving the thermal engine.

More precisely, the pedal is a clutch pedal and/or an accelerator pedal. These actions performed on the clutch or accelerator pedals constitute so-called conditions prior to a restarting of the thermal engine by the "Stop and Go" system. The particular choice of these actions of pressing the clutch or accelerator pedals is in no way limiting, the invention being able to apply in the same way to other actions relating to other prior conditions.

In this particular context of the invention, the pressing is detected by at least one sensor for the pressing of the pedal, the detection of a first pressing level triggering the application of the magnetization electric current to the rotor of the reversible electrical machine, and the detection of a second pressing level triggering the start instruction.

Likewise, the prior action cancellation consists of a zero pressing of the pedal. In other words, the driver must completely release the pedal concerned in order to enable a new preparation phase.

Two practical embodiments can be envisaged.

Other objects and advantages of the invention will be apparent from the following description, the accompanying drawings and the appended claims.

According to a first embodiment, the first and second pressing levels are detected by two successive binary sensors.

According to a second embodiment, the first and second pressing levels are detected by a continuous sensor.

This second embodiment has the advantage that the continuous sensor is also able to supply a pressing speed.

It is then possible to take this speed parameter into account in order to refine the determination of the first pressing level and to decide for example that, according to the invention, the value of the first pressing level increases when the pressing speed decreases up to a given minimum value.

It is also possible to provide, according to the invention, at pressing speeds lower than the minimum value, for no magnetization electric current to be applied to the rotor of the reversible electrical machine.

The description that follows with regard to the accompanying drawings, given by way of non-limiting examples, will give a clear understanding of what the invention consists and how it can be implemented.

DETAILED DESCRIPTION OF THE PREFERRED EMBODIMENTS

Figure 1:
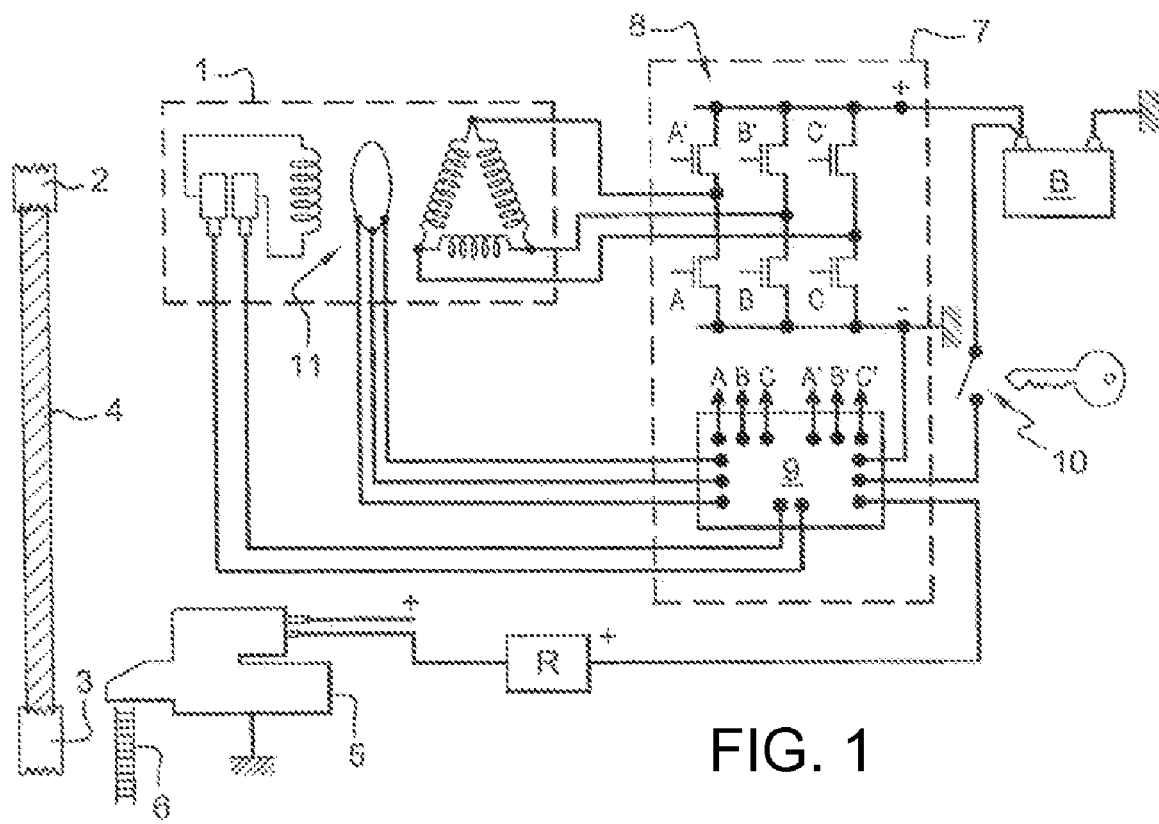
FIG. 1 is a diagram of an automatic starting/stopping system for a thermal engine of a vehicle.

FIG. 1 depicts a system for the automatic starting/stopping of a thermal engine of a vehicle, in particular the "Stop and Go" system mentioned above. In the remainder of the description, reference will be made to a vehicle equipped with a reversible electrical machine, such as an alternator/starter, controlled according to the methods of the "Stop and Go" system. Naturally any other electrical machine, reversible or not, could be used in the context of the invention.

The system in FIG. 1 comprises:

a separate alternator/starter 1 comprising a shaft terminating in a pulley 2 that is connected to a pulley 3 of the crankshaft of the thermal engine by means of a belt 4. This alternator/starter is mounted in the place that the alternator normally takes;

optionally, an additional conventional starter 5 whose pinion is able to mesh with the teeth on a ring 6 for driving the shaft of the thermal engine;

control electronics 7.

The control electronics 7 comprise:

a transistor bridge 8 that constitutes a reversible power converter and that provides control in starter mode and synchronous rectification in alternator mode;

a control module 9 that controls the various transistors of the converter 8 and in particular manages the following various functions:

power in starter and alternator modes
regulation in alternator mode
transition from starter to alternator mode
operating strategy.

The control module 9 is for this purpose supplied with the voltage of the battery, referenced B, to which it is connected by means of an ignition switch 10 of the vehicle.

It receives as an input information enabling it to determine the angular position of the rotor of the alternator/starter 1, for example information supplied by sensors 11, such as Hall effect sensors.

As an output, it supplies the field winding of the alternator/starter 1 and the starter 5 and generates the voltages injected on the gates (A, B, C; A', B', C') of the transistors of the bridge 8.

Moreover, the control module 9 receives information coming from measurement and detection sensors distributed in the vehicle, such as sensors for detecting the position of various components, such as clutch pedal, accelerator pedal, etc, this information constituting in particular conditions prior to the sending of a start instruction.

In an automatic starting/stopping system, such as the "Stop and Go" system, an instruction to start the thermal engine of the vehicle can be given following a prior action, for example by pressing the clutch pedal or accelerator pedal.

In order to obtain actual starting of the engine as quickly as possible after detection of a prior action, the invention proposes to magnetize the rotor of the alternator/starter by early application of an electric current as soon as the prior action is detected, that is to say by anticipation, without awaiting the sending of the start instruction.

This method of preparing the rotor can be implemented by:

at least two two-state sensors, namely a pedal start-of-travel sensor (which is for example at 0 if the pedal is released and at 1 if it is pressed by more than 10%) and an end-of-travel sensor (which is for example at 0 if the pedal is pressed by less than 90% and at 1 if it is pressed by more than 90%), or a continuous sensor on the pedal that supplies a continuous value between 0 if the pedal is released and 100% if the pedal is completely pressed.

In the case of two two-state sensors, the start-of-travel sensor detects a first pedal pressing level (more than 10% for example) and the end-of-travel sensor detects a second pressing level (more than 90% for example).

The magnetization of the rotor is initiated if the stop travel sensor is activated whilst the actual starting instruction is sent only if the end-of-travel sensor is activated in its turn.

In all cases the application interrupts the magnetization of the rotor by cutting off the magnetization electric current if an actual start instruction is not sent after a given time, 3 seconds for example. A new magnetization is possible only when the driver has cancelled the prior action, that is to say here by releasing the pedal.

A maximum of five interrupted attempts at magnetization not followed by an actual start instruction are enabled, in order to avoid risks of overheating of the alternator/starter.

Figure 2:
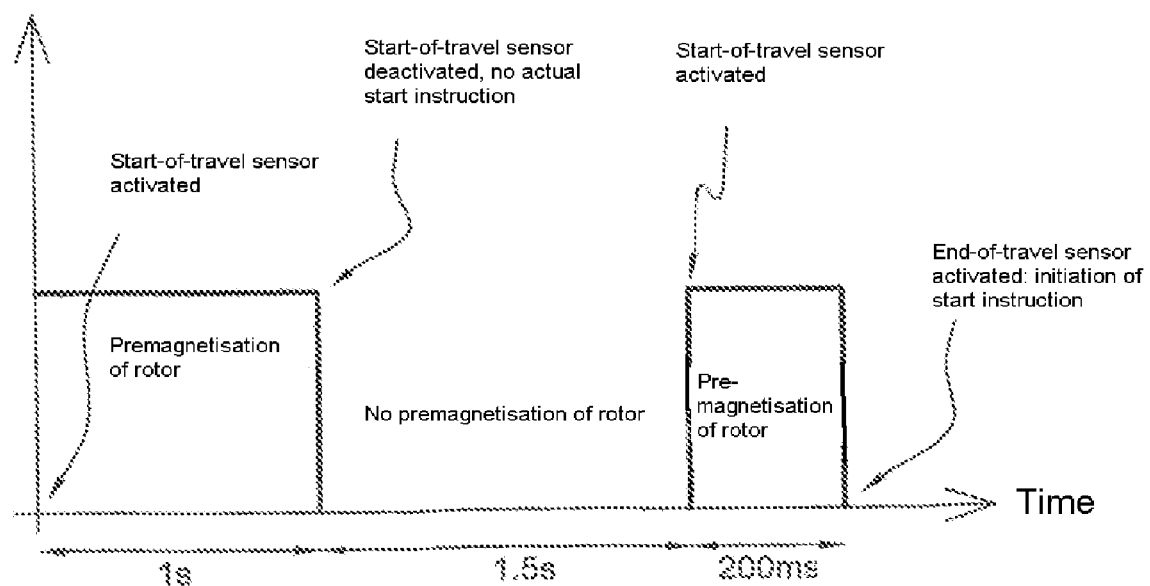
FIG. 2 is a timing diagram illustrating an example of magnetization of the rotor of the alternator/starter shown in FIG. 1.

The timing diagram in FIG. 2 gives an example of magnetization of the rotor with two two-state sensors.

On this timing diagram, it can be seen that a first magnetization has been interrupted because the pedals have been released before having reached the second pressing level. The second magnetization has been followed by an actual starting of the engine, the end of travel sensor having been activated.

In the case of a continuous sensor, two parameters can be taken into account: firstly the pressing level of the pedal and secondly the speed of pressing, that is to say the speed at which the driver presses the pedal. This speed can be evaluated directly from a percentage pressing per unit of time.

If the driver presses the pedal by more than 1% in less than 1 millisecond, the application considers that the pressing speed is very rapid and that the driver will very probably start. The application then begins to magnetize the rotor when a pressing percentage of 30% is reached, the actual starting instruction being initiated at 90% pressing.

If the driver presses the pedal by 1% in a time of between 1 and 3 milliseconds, the application considers that the pressing speed is rapid and that the driver will probably start. The application then begins to magnetize the rotor when a pressing percentage of 60% is reached, the actual starting instruction still being initiated at 90% pressing.

It is of course possible to imagine a pressing percentage for starting the magnetization of the rotor that increases, proportionally for example, when the pressing speed decreases.

Below a certain pedal pressing speed (less than 1° A) in 1 ms for example), the application considers that the driver does not wish to start and the rotor is not magnetized. The start instruction will nevertheless be given if the pedal is pressed by more than 90% without however benefiting from the advantage of anticipated magnetization.

There too, the application stops the magnetization of the rotor if an actual starting instruction has not occurred after three seconds. A new magnetization is possible only when the driver has released the pedal. To avoid risks of overheating, a maximum of five successive magnetizations without actual start instruction are enabled.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A method of preparing a reversible electrical machine with a phase for starting a thermal engine of a vehicle equipped with an automatic starting/stopping system, the reversible electrical machine comprising a rotor coupled to said thermal engine, said method comprising the steps of detecting an action prior to a start instruction to start the thermal engine, and applying an electrical magnetization current to the reversible electric machine as soon as said prior action is detected;
    wherein said prior action is a pressing of a control pedal driving the thermal engine;
    wherein said pedal is a clutch pedal and/or an accelerator pedal;
    wherein said reversible electric machine further comprises at least one sensor, said method further comprising the step of detecting said pressing of said pedal using said at least one sensor, wherein said detection of a first pressing level triggering the application of said magnetization electric current to the rotor of the reversible electrical machine, and the detection of a second pressing level triggering said start instruction;
    wherein said first pressing level is at least equal to approximately 10% of a total pressing and the said second pressing level is at least equal to approximately 90% of the total pressing.

2. The method according to claim 1, wherein said first and second pressing levels are detected by a continuous sensor.

3. The method according to claim 2, wherein said continuous sensor is also able to supply a pressing speed.

4. The method according to claim 3, wherein said value of the first pressing level increases when the pressing speed decreases as far as a given minimum value.

5. The method according to claim 4, wherein, for pressing speeds below said minimum value, no magnetization electric current is applied to the rotor of the reversible electrical machine.

6. The method according to claim 1, wherein the application of the magnetization electric current is interrupted if a start instruction is not triggered after a given period after said prior action is detected.

7. The method according to claim 6, wherein, after an interruption of the application of the magnetization electric current, a new attempt at preparing the reversible electrical machine is made only after cancellation of said prior action.

8. The method according to claim 7, wherein said prior action cancellation consists of a zero pressing of said pedal.

9. The method according to claim 6, wherein a new attempt at preparing the reversible electrical machine is prevented if a total number of attempts of triggering said start instruction exceeds a maximum number of interrupted attempts.

10. A method of preparing a reversible electrical machine with a phase for starting a thermal engine of a vehicle equipped with an automatic starting/stopping system, the reversible electrical machine comprising a rotor coupled to said thermal engine, said method comprising the steps of detecting an action prior to a start instruction to start the thermal engine, and applying an electrical magnetization current to the reversible electric machine as soon as said prior action is detected;
    wherein said prior action is a pressing of a control pedal driving the thermal engine;
    wherein said pedal is a clutch pedal and/or an accelerator pedal;
    wherein said reversible electric machine further comprises at least one sensor, said method further comprising the step of detecting said pressing of said pedal using said at least one sensor, wherein said detection of a first pressing level triggering the application of said magnetization electric current to the rotor of the reversible electrical machine, and the detection of a second pressing level triggering said start instruction;
    wherein said first and second pressing levels are detected by two successive binary sensors.

* * * * *

UNITED STATES PATENT AND TRADEMARK OFFICE
CERTIFICATE OF CORRECTION

PATENT NO. : 8,179,070 B2
APPLICATION NO. : 11/575762
DATED : May 15, 2012
INVENTOR(S) : Lecole et al.

Page 1 of 1

It is certified that error appears in the above-identified patent and that said Letters Patent is hereby corrected as shown below:

In the Specifications

In Column 5, line 6, please delete "1° A)" and insert -- 1% -- therefor.

Signed and Sealed this
Fourteenth Day of May, 2013

Teresa Stanek Rea
*Acting Director of the United States Patent and Trademark Office*